United States Patent
Song et al.

(10) Patent No.: US 12,397,606 B2
(45) Date of Patent: Aug. 26, 2025

(54) METHOD FOR CONTROLLING VEHICLE THERMAL MANAGEMENT SYSTEM

(71) Applicants: HYUNDAI MOTOR COMPANY, Seoul (KR); KIA CORPORATION, Seoul (KR)

(72) Inventors: Jun Ho Song, Hwaseong-si (KR); Hyung Jun Lee, Seoul (KR); Chi Weon Jeong, Hwaseong-si (KR); Kwang Weon Ahn, Hwaseong-si (KR); Tae Eun Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 296 days.

(21) Appl. No.: 17/956,280

(22) Filed: Sep. 29, 2022

(65) Prior Publication Data
US 2023/0182525 A1    Jun. 15, 2023

(30) Foreign Application Priority Data
Dec. 14, 2021   (KR) ......................... 10-2021-0178968

(51) Int. Cl.
*B60H 1/00*         (2006.01)

(52) U.S. Cl.
CPC ..... *B60H 1/00278* (2013.01); *B60H 1/00821* (2013.01)

(58) Field of Classification Search
CPC .................. B60H 1/00278; B60H 1/00821
See application file for complete search history.

(56) References Cited

U.S. PATENT DOCUMENTS

| | | |
|---|---|---|
| 5,987,905 A | 11/1999 | Nonoyama et al. |
| 8,565,971 B2 | 10/2013 | Park et al. |
| 2011/0016899 A1 | 1/2011 | Ogura |
| 2013/0090805 A1 | 4/2013 | Park et al. |

FOREIGN PATENT DOCUMENTS

| | | |
|---|---|---|
| JP | H11-115462 A | 4/1999 |
| JP | 2004-220799 A | 8/2004 |
| JP | 2005-001539 A | 1/2005 |
| JP | 2006-278045 A | 10/2006 |
| JP | 4561303 B2 | 10/2010 |
| JP | 4670797 B2 | 4/2011 |

(Continued)

OTHER PUBLICATIONS

Lim (KR20150009340A), English Translation, Cooling control method for a battery of vehicle, 2015, Whole document (Year: 2015).*

(Continued)

*Primary Examiner* — Jerry-Daryl Fletcher
*Assistant Examiner* — Keith Stanley Myers
(74) *Attorney, Agent, or Firm* — MCDONALD BOEHNEN HULBERT & BERGHOFF LLP

(57) ABSTRACT

A method for controlling a vehicle thermal management system includes determining an outdoor air fraction (OAF) based on a temperature of a battery when the outdoor air intake into a passenger compartment is required, wherein the OAF increases as the temperature of the battery increases, and the OAF decreases as the temperature of the battery decreases.

11 Claims, 5 Drawing Sheets

(56) References Cited

FOREIGN PATENT DOCUMENTS

| JP | 2013224105 A | * | 10/2013 |
| JP | 2015003617 A | * | 1/2015 |
| KR | 2010-0019657 A | | 2/2010 |
| KR | 2013-0036827 A | | 4/2013 |
| KR | 2015009340 A | * | 1/2015 |
| KR | 10-1558655 B1 | | 10/2015 |

OTHER PUBLICATIONS

Minami et al. (JP4670797B2), English Translation, Vehicle battery cooling system, 2011, Whole document (Year: 2011).*
Arakawa (JP2013224105A), English Translation, Vehicle battery cooling device, 2013. Whole document (Year: 2013).*
Nakahata et al. (JP2015003617A), English Translation, Air-conditioning system, 2015, Whole document (Year: 2015).*

* cited by examiner

METHOD FOR CONTROLLING VEHICLE THERMAL MANAGEMENT SYSTEM

CROSS REFERENCE TO RELATED APPLICATIONS

This application is based on and claims the benefit of priority to Korean Patent Application No. 10-2021-0178968, filed on Dec. 14, 2021, in the Korean Intellectual Property Office, the disclosure of which is incorporated herein in its entirety by reference.

TECHNICAL FIELD

The present disclosure relates to a method for controlling a vehicle thermal management system, and more particularly, to a method for controlling a vehicle thermal management system capable of improving the cooling of a battery using an air-cooled battery cooling system and the cooling of a passenger compartment using a heating, ventilation, and air conditioning (HVAC) system simultaneously.

BACKGROUND

With a growing interest in energy efficiency and environmental issues, there is a demand for development of eco-friendly vehicles that can replace internal combustion engine vehicles. Such eco-friendly vehicles are classified into electric vehicles which are driven by using fuel cells or electricity as a power source and hybrid vehicles which are driven by using an engine and a battery.

An electric vehicle and a hybrid vehicle may include a battery mounted on a vehicle body, and the temperature of the battery may excessively increase according to the outdoor air temperature (or ambient temperature), driving conditions, and the like of the vehicle. When the temperature of the battery excessively increases, the output of the battery may be limited in order to prevent firing of the battery and deterioration of durability of the battery, thereby degrading the power performance, fuel efficiency or electricity consumption, and the like of the vehicle. To solve these problems, the electric vehicle and the hybrid vehicle may include at least one of an air-cooled battery cooling system and a water-cooled battery cooling system, and the battery cooling system may cool the battery to thereby prevent the temperature of the battery from excessively increasing.

A hybrid vehicle or a small electric vehicle may have a small-capacity battery disposed under a rear or center floor of the vehicle. The hybrid vehicle or the small electric vehicle may use an air-cooled battery cooling system suitable for cooling the small-capacity battery. In the air-cooled battery cooling system, the small-capacity battery may communicate with a passenger compartment through a communication hole provided in the vehicle body, and the small-capacity battery may be cooled by the indoor air of the passenger compartment.

A vehicle thermal management system may include a battery cooling system configured to cool the battery, and a heating, ventilation, and air conditioning (HVAC) system configured to heat or cool the air in the passenger compartment of the vehicle.

The HVAC system may include an HVAC casing located in front of the passenger compartment of the vehicle. An evaporator and an interior condenser (or heater core) may be mounted in the HVAC casing. The HVAC casing may include an inlet duct allowing the inflow of indoor air and/or outdoor air, and a plurality of outlet ducts communicating with the passenger compartment. In addition, the inlet duct may include an indoor air passage guiding the indoor air flow, an outdoor air passage guiding the outdoor air flow, and a switching door disposed between the indoor air passage and the outdoor air passage.

The switching door may be configured to adjust the airflow between the indoor air passage and the outdoor air passage. The switching door may move between an indoor air circulation position, an outdoor air intake position, and an intermediate opening position. When the switching door is in the indoor air circulation position, the switching door may block the outdoor air from flowing through the outdoor air passage, but may only allow the indoor air to flow through the indoor air passage. When the switching door is in the outdoor air intake position, the switching door may block the indoor air from flowing through the indoor air passage, but may only allow the outdoor air to flow through the outdoor air passage. When the switching door is in the intermediate opening position, the switching door may allow the indoor air to flow through the indoor air passage and allow the outdoor air to flow through the outdoor air passage. An outdoor air fraction (OAF) may be determined based on the positions of the switching door. Here, the OAF refers to a ratio of an outdoor-air intake flow rate and a total supply air flow rate. In particular, the OAF may be expressed as a percentage of the outdoor air being brought into the passenger compartment.

When the temperature of the battery excessively increases, the switching door may move to increase the OAF so as to increase the flow rate of the air directed toward the battery. However, as the OAF increases, the cooling efficiency of the passenger compartment obtained by the cooling operation of the HVAC system may be relatively reduced.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a method for controlling a vehicle thermal management system designed to optimally vary an outdoor air fraction (OAF) based on a temperature of a battery, a cooling load of a passenger compartment, and the like when the battery is overheated and the outdoor air intake into the passenger compartment is required, thereby simultaneously improving cooling performance of a heating, ventilation, and air conditioning (HVAC) system with respect to the passenger compartment, and improving cooling performance of a battery cooling system with respect to the battery.

According to an aspect of the present disclosure, a method for controlling a vehicle thermal management system may include determining an OAF based on a temperature of a battery when the outdoor air intake into a passenger compartment is required. As the temperature of the battery increases, the OAF may increase. As the temperature of the battery decreases, the OAF may decrease.

It may be determined that the outdoor air intake into the passenger compartment is required when the temperature of the battery is higher than or equal to a threshold value.

The temperature of the battery may be divided into a plurality of battery temperature ranges, and the OAF may be determined based on a plurality of OAF maps corresponding to the plurality of battery temperature ranges.

Each OAF map may include a plurality of OAFs which are determined based on changes in vehicle speed.

According to another aspect of the present disclosure, a method for controlling a vehicle thermal management system may include: calculating a cooling load of a passenger compartment when the outdoor air intake into the passenger compartment is required; and determining an OAF based on the calculated cooling load. As the calculated cooling load increases, the OAF may decrease. As the calculated cooling load decreases, the OAF may increase.

The cooling load may be calculated based on a target cooling temperature set by a user and an indoor temperature of the vehicle.

A corrected cooling load may be calculated by applying at least one correction value to the cooling load.

A corrected cooling load may be calculated by applying a first correction value with respect to a temperature of a battery to the cooling load.

A corrected cooling load may be calculated by applying a second correction value with respect to a vehicle speed to the cooling load.

A corrected cooling load may be calculated by applying a third correction value with respect to an outdoor air temperature of the vehicle to the cooling load.

The cooling load may be calculated based on a difference between a target cooling temperature set by a user and an actual cooling temperature measured by a temperature sensor.

The OAF may be determined for each outdoor air intake signal when two or more outdoor air intake signals are generated based on the overheat degree of a battery which is divided into two or more levels. In particular, when an outdoor air intake signal is generated based on the higher overheat degree of the battery, the OAF may be relatively increased.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
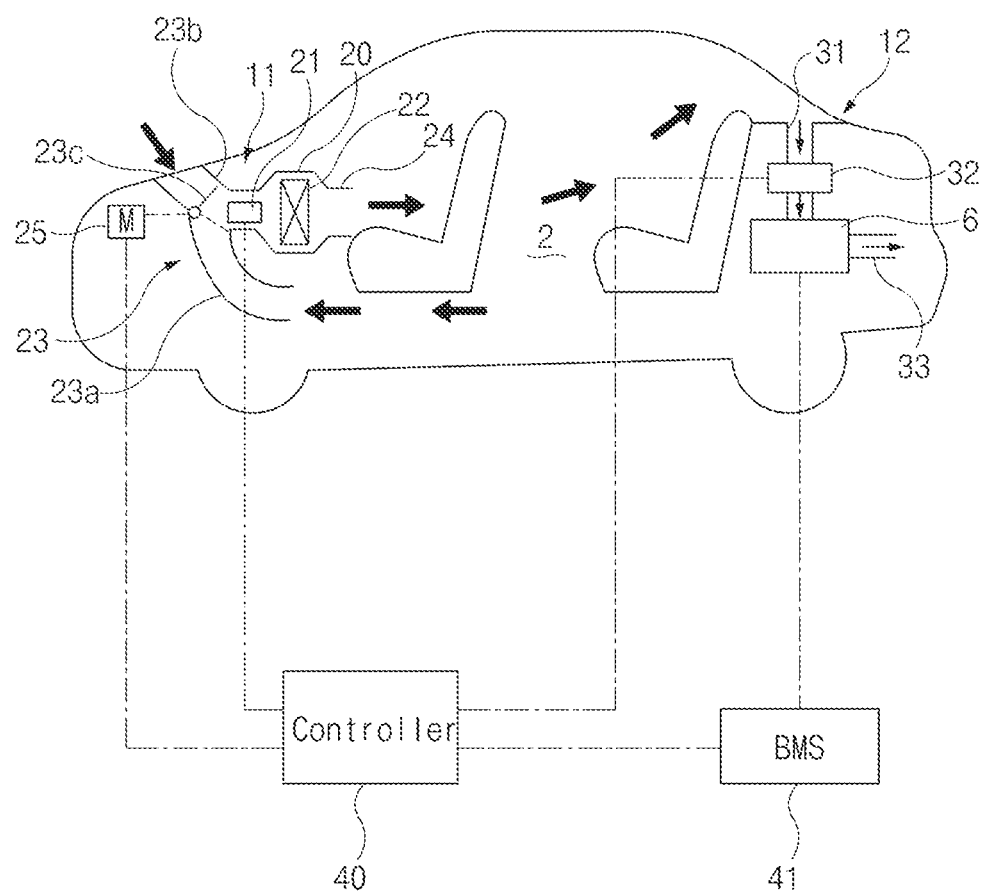
FIG. 1 illustrates a vehicle including a vehicle thermal management system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle thermal management system according to an exemplary embodiment of the present disclosure may include a heating, ventilation, and air conditioning (HVAC) system 11 configured to heat or cool air flowing into a passenger compartment 2, and a battery cooling system 12 configured to cool a battery 6.

The passenger compartment 2 may be partitioned from a front compartment by a dash panel (not shown). The HVAC system 11 may include an HVAC casing 20, and the HVAC casing 20 may be located in front of the passenger compartment 2. An air blower 21 and an evaporator 22 may be received in the HVAC casing 20. The evaporator 22 may be located on the downstream side of the air blower 21 in the HVAC casing 20, and the evaporator 22 may be configured to cool the air directly blown by forward rotation of the air blower 21. According to an exemplary embodiment, the evaporator 22 may constitute a known refrigeration cycle together with a compressor, a condenser, an expansion valve, a circulation pump, and the like, and the evaporator 22 may be configured to cool the air using a refrigerant circulated by the compressor and the circulation pump of the refrigeration cycle. In addition, an interior condenser or a heater core may be received in the HVAC casing 20, and the interior condenser or the heater core may be located on the downstream side of the evaporator 22.

The HVAC casing 20 may include an inlet duct 23 allowing the inflow of indoor air and/or outdoor air, and an outlet duct 24 communicating with the passenger compartment 2. In addition, the inlet duct 23 may include an indoor air passage 23a guiding the indoor air flow, an outdoor air passage 23b guiding the outdoor air flow, and a switching door 23c disposed between the indoor air passage 23a and the outdoor air passage 23b. The indoor air passage 23a may communicate with the inside of the passenger compartment 2, and the outdoor air passage 23b may communicate with the outside of the passenger compartment 2 or the outside of the vehicle.

The switching door 23c may be operated by an actuator 25. The switching door 23c may adjust the airflow between the indoor air passage 23a and the outdoor air passage 23b. The switching door 23c may move between an indoor air circulation position, an outdoor air intake position, and an intermediate opening position. When the switching door 23c is in the indoor air circulation position, the switching door 23c may block the outdoor air from flowing through the outdoor air passage 23b, but may only allow the indoor air to flow through the indoor air passage 23a. When the switching door 23c is in the outdoor air intake position, the switching door 23c may block the indoor air from flowing through the indoor air passage 23a, but may only allow the outdoor air to flow through the outdoor air passage 23b. When the switching door 23c is in the intermediate opening position, the switching door 23c may allow the indoor air to flow through the indoor air passage 23a and allow the outdoor air to flow through the outdoor air passage 23b. An outdoor air fraction (OAF) may be determined based on the positions of the switching door 23c, and the OAF refers to a ratio of an outdoor-air intake flow rate and a total supply air flow rate. In particular, the OAF may be defined as a percentage of the outdoor air being brought into the passenger compartment. When the switching door 23c is in the outdoor air intake position, the opening degree of the outdoor air passage 23b may be 100%, and the opening degree of the indoor air passage 23a may be 0%, and thus the OAF may be 100%. When the switching door 23c is in the indoor air circulation position, the opening degree of the outdoor air passage 23b may be 0% and the opening degree of the indoor air passage 23a may be 100%, and thus the OAF may be 0%. When the switching door 23c is in the intermediate opening position, the OAF may be equal to or be proportional to the opening degree of the outdoor air passage 23b. As the position of the switching door 23c is adjusted in a state in which the switching door 23c is in the intermediate opening position, the opening degree of the outdoor air passage 23b may exceed 0% and be less than 100%.

According to an exemplary embodiment of the present disclosure, the battery cooling system 12 may be an air-cooled battery cooling system configured to cool the battery 6 using the air received in the passenger compartment 2. The battery cooling system 12 may include an air intake hole or air intake passage 31 provided in a vehicle body, and a battery blower 32 blowing the air to the battery 6. The battery 6 may be disposed on the rear of the vehicle or under the floor of the vehicle, and the air intake hole or the air intake passage 31 may be formed in a package tray or a portion of the floor adjacent to a rear seat of the vehicle. The battery 6 may communicate with the passenger compartment 2 through the air intake hole or the air intake passage 31. The air received in the passenger compartment 2 may be directed to the battery 6 through the air intake hole or the air intake passage 31, and accordingly the air may cool the battery 6. The battery blower 32 may be disposed between the air intake passage 31 and the battery 6. In addition, the battery cooling system 12 may include a discharge passage 33 through which the air having exchanged heat with the battery 6 is discharged to the outside of the vehicle.

When the switching door 23c is in the indoor air circulation position, the switching door 23c may block the outdoor air from flowing through the outdoor air passage 23b, but may only allow the indoor air to flow through the indoor air passage 23a. Accordingly, when the switching door 23c is in the indoor air circulation position, only the indoor air may be circulated by the HVAC system 11 in the passenger compartment 2. When only the indoor air is circulated in the passenger compartment 2, pressure in the passenger compartment 2 may be relatively low, and accordingly the flow rate of the air directed to the battery 6 through the air intake passage 31 may be relatively reduced.

When the switching door 23c is in the indoor air circulation position, only the indoor air may be circulated in the passenger compartment 2, so the pressure of the passenger compartment 2 may be relatively low. Accordingly, the flow rate of the air directed to the battery 6 through the air intake passage 31 may be relatively reduced, and thus battery cooling performance may relatively deteriorate. In a state in which the temperature of the battery 6 excessively increases according to the outdoor air temperature (or ambient temperature), driving condition, and the like of the vehicle or the battery 6 is overheated, the switching door 23c may move to the outdoor air intake position or the intermediate opening position so that the outdoor air may be brought into the passenger compartment 2. As outdoor air is brought into the passenger compartment 2, the pressure of the passenger compartment 2 may be relatively high, thus the flow rate of the air directed to the battery 6 through the air intake passage may be relatively increased. In particular, a controller 40 may adjust the position of the switching door 23c so as to vary the opening degree of the outdoor air passage 23b based on the temperature of the battery 6 or a cooling load, and thus the OAF may be varied.

The controller 40 may be configured to control the actuator 25 for driving the switching door 23c, the air blower 21, and the battery blower 32. The controller 40 may control the actuator 25 to move the switching door 23c to thereby vary the opening degree of the outdoor air passage 23b. As the opening degree of the outdoor air passage 23b is varied, the OAF may be varied.

The conditions of the battery 6 including various battery information such as a temperature of the battery 6, a humidity of the battery 6, an output of the battery 6, and an overheat degree of the battery 6 may be measured or monitored by a battery management system (BMS) 41 in real time. The controller 40 may receive the battery information such as the temperature of the battery 6, the humidity of the battery 6, the output of the battery 6, and the overheat degree of the battery 6 from the battery management system 41.

In a method for controlling a vehicle thermal management system according to exemplary embodiments of the present disclosure, when the outdoor air intake into the passenger compartment 2 is required to cool the battery 6, the controller 40 may determine the OAF based on the temperature of the battery 6, the cooling load of the passenger compartment 2, and the like, thereby preventing deterioration of cooling performance of the HVAC system 11 with respect to the passenger compartment 2, and achieving satisfactory cooling performance of the battery cooling system 12 with respect to the battery 6.

Figure 2:
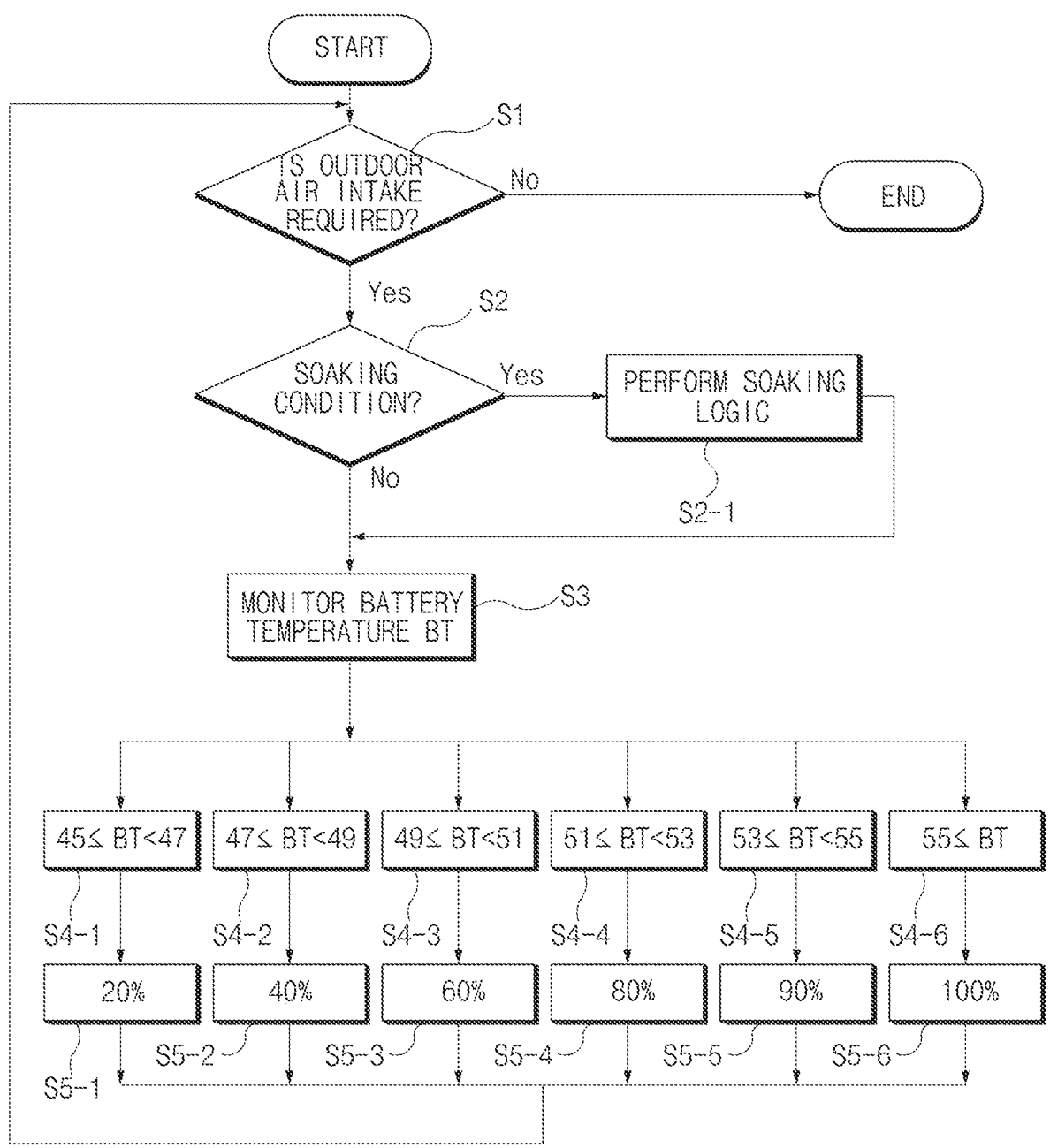
FIG. 2 illustrates a flowchart of a method for controlling a vehicle thermal management system according to an exemplary embodiment of the present disclosure.

FIG. 2 illustrates a flowchart of a method for controlling a vehicle thermal management system according to an exemplary embodiment of the present disclosure.

The controller 40 or the battery management system 41 may determine whether the outdoor air intake into the passenger compartment 2 is required to cool the battery 6 at S1.

According to an exemplary embodiment, the battery management system 41 may compare a measured temperature of the battery 6 and a predetermined reference temperature to thereby determine whether the outdoor air intake into the passenger compartment 2 is required. When the temperature of the battery 6 is higher than or equal to the predetermined reference temperature, the battery management system 41 may determine that the battery 6 is overheated, and when the temperature of the battery 6 is lower than the predetermined reference temperature, the battery management system 41 may determine that the battery 6 is not overheated. The battery management system 41 may transmit, to the controller 40, a result of determination regarding whether the outdoor air intake into the passenger compartment 2 is required.

According to another exemplary embodiment, the battery management system 41 may transmit information about the states/conditions of the battery 6 (hereinafter referred to as "battery information"), such as a temperature of the battery 6, an output of the battery 6, and a humidity of the battery 6, to the controller 40, and the controller 40 may determine whether the outdoor air intake into the passenger compartment 2 is required based on the battery information received from the battery management system 41.

When it is determined in S1 that the outdoor air intake is required, the controller 40 may determine whether an indoor condition of the vehicle meets a soaking condition at S2. The soaking condition refers to a condition in which the vehicle is stopped for a long time, and an indoor temperature of the vehicle is higher than an outdoor air temperature. Specifically, the controller 40 may determine that the indoor condition of the vehicle meets the soaking condition under the following conditions: within a predetermined time (for example, one minute) after starting of the vehicle, a difference between the indoor temperature and the outdoor air temperature is higher than or equal to a predetermined temperature (for example, 0-1° C.); and the amount of solar radiation measured by a solar sensor is higher than or equal to a predetermined amount of solar radiation (for example, 300 W).

When it is determined in S2 that the indoor condition of the vehicle meets the soaking condition, a soaking logic may be performed (at S2-1. The soaking logic refers to a logic for adjusting the position of the switching door 23c so as to maintain relatively high OAF (for example, 80%-100%) for a predetermined time. The controller 40 may control the actuator 25 to thereby adjust the position of the switching door 23c. For example, within one minute after starting of the vehicle in a state in which the vehicle is parked for a long time and the indoor temperature of the vehicle relatively rises due to the greenhouse effect, when the difference between the indoor temperature of the vehicle and the outdoor air temperature is higher than or equal to 0° C., and the amount of solar radiation measured by the solar sensor is higher than or equal to 300 W, the controller 40 may determine that the indoor condition of the vehicle meets the soaking condition. When it is determined that the indoor condition of the vehicle meets the soaking condition, the controller 40 may control the actuator 25 to place the switching door 23c in the outdoor air intake position for one minute. Accordingly, the OAF may be maintained at 100% for one minute, and the passenger compartment 2 of the vehicle may be not only ventilated by the outdoor air but also cooled by the outdoor air of relatively low temperature.

When it is determined in S2 that the indoor condition of the vehicle does not meet the soaking condition or after the soaking logic is performed in S2-1, the controller 40 may monitor a temperature BT of the battery 6 at S3. The temperature of the battery 6 may be measured by the battery management system 41, and the controller 40 may monitor the temperature BT of the battery 6 by receiving the temperature of the battery 6 from the battery management system 41. According to an alternative exemplary embodiment, the controller 40 may monitor the temperature BT of the battery 6 while performing the soaking logic simultaneously.

The controller 40 may determine the OAF based on the temperature BT of the battery 6. Specifically, as the temperature BT of the battery 6 increases, the OAF may increase, and as the temperature BT of the battery 6 decreases, the OAF may decrease. For example, when the temperature BT of the battery 6 is higher than or equal to 45° C. and is lower than 47° C. at S4-1, the OAF may be 20% at S5-1. When the temperature BT of the battery 6 is higher than or equal to 47° C. and is lower than 49° C. at S4-2, the OAF may be 40% at S5-2. When the temperature BT of the battery 6 is higher than or equal to 49° C. and is lower than 51° C. at S4-3, the OAF may be 60% at S5-3. When the temperature BT of the battery 6 is higher than or equal to 51° C. and is lower than 53° C. at S4-4, the OAF may be 80% at S5-4. When the temperature BT of the battery 6 is higher than or equal to 53° C. and is lower than 55° C. at S4-5, the OAF may be 90% at S5-5. When the temperature BT of the battery 6 is higher than or equal to 55° C. at S4-6, the OAF may be 100% at S5-6.

The switching door 23c may be configured to vary the opening degree of the outdoor air passage 23b under control of the controller 40 and the actuator 25 so that the OAF may be varied based on the temperature BT of the battery 6. The controller 40 may control the actuator 25 in response to the temperature BT of the battery 6 so that the OAF may be varied based on the temperature BT of the battery 6. Specifically, the controller 40 may control the actuator 25 such that the higher the temperature BT of the battery 6, the higher the OAF, and the lower the temperature BT of the battery 6, the lower the OAF, and accordingly the position of the switching door 23c may be varied.

When the battery 6 is overheated, the outdoor air may be brought into the passenger compartment 2 under the control of the controller 40, and the controller 40 may determine the OAF based on the temperature BT of the battery 6, thereby achieving the satisfactory cooling performance of the battery cooling system 12 with respect to the battery 6, as well as preventing deterioration of the cooling performance of the HVAC system 11 with respect to the passenger compartment 2.

Figure 3:
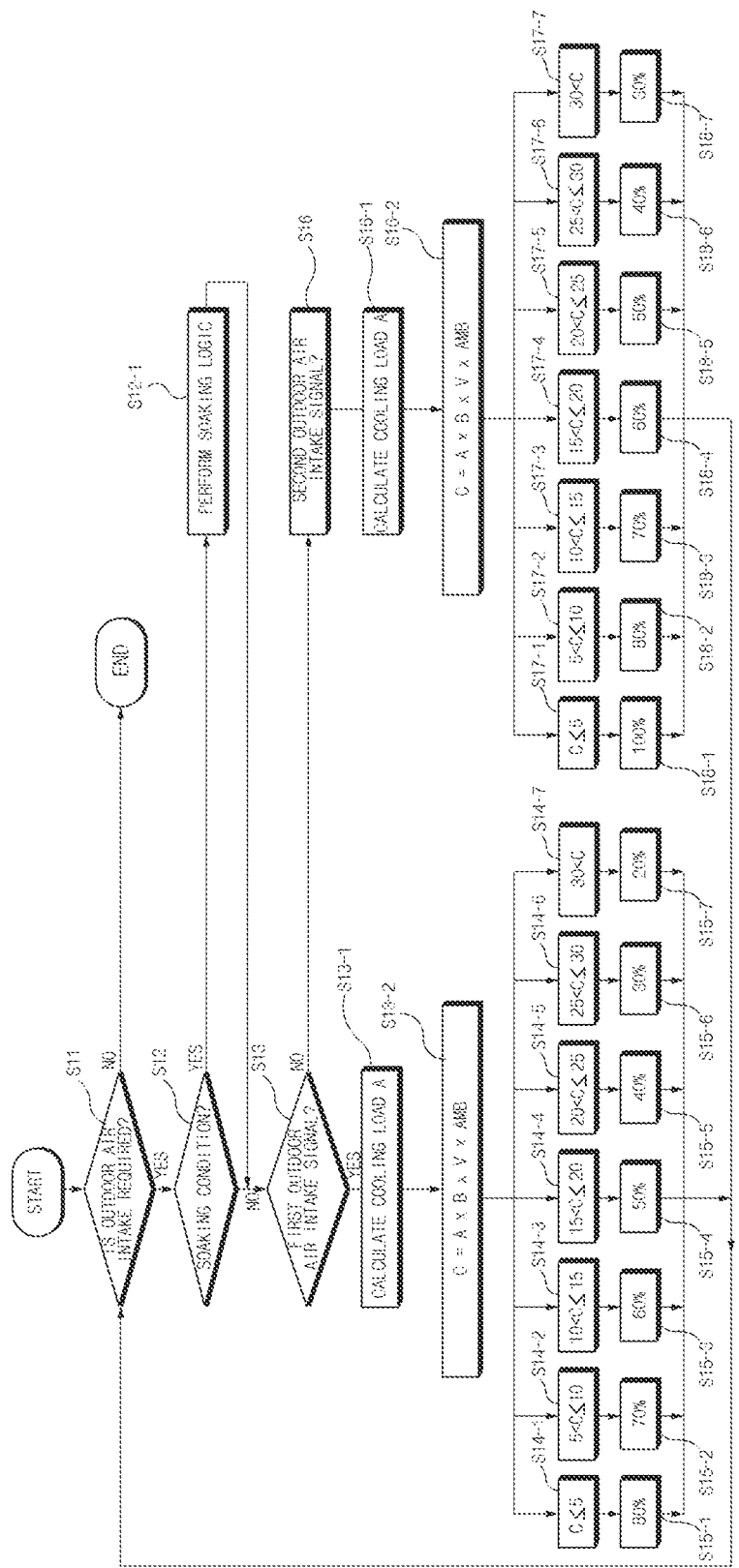
FIG. 3 illustrates a flowchart of a method for controlling a vehicle thermal management system according to an exemplary embodiment of the present disclosure.

FIG. 3 illustrates a flowchart of a method for controlling a vehicle thermal management system according to an exemplary embodiment of the present disclosure.

The controller 40 or the battery management system 41 may determine whether the outdoor air intake into the passenger compartment 2 is required to cool the battery 6 at S11. According to an exemplary embodiment, the battery management system 41 may compare a measured temperature of the battery 6 and a predetermined reference temperature to thereby determine whether the outdoor air intake into the passenger compartment 2 is required. When the temperature of the battery 6 is higher than or equal to the predetermined reference temperature, the battery management system 41 may determine that the battery 6 is overheated, and when the temperature of the battery 6 is lower than the predetermined reference temperature, the battery management system 41 may determine that the battery 6 is not overheated. The battery management system 41 may transmit, to the controller 40, a result of determination regarding whether the outdoor air intake into the passenger compartment 2 is required.

According to another exemplary embodiment, the battery management system 41 may transmit battery information, such as a temperature of the battery 6, an output of the battery 6, and a humidity of the battery 6, to the controller 40, and the controller 40 may determine whether the outdoor air intake into the passenger compartment 2 is required based on the battery information received from the battery management system 41.

When it is determined in S11 that the outdoor air intake is required, the controller 40 may determine whether an indoor condition of the vehicle meets a soaking condition at S12. The soaking condition refers to a condition in which the vehicle is stopped for a long time, and an indoor temperature of the vehicle is higher than an outdoor air temperature. Specifically, the controller 40 may determine that the indoor condition of the vehicle meets the soaking condition under the following conditions: within a predetermined time (for example, one minute) after starting of the vehicle, a difference between the indoor temperature and the outdoor air temperature is higher than or equal to a predetermined temperature (for example, 0-1° C.); and the amount of solar radiation measured by a solar sensor is higher than or equal to a predetermined amount of solar radiation (for example, 300 W).

When it is determined in S12 that the indoor condition of the vehicle meets the soaking condition, a soaking logic may be performed at S12-1. The soaking logic refers to a logic for adjusting the position of the switching door 23c so as to maintain relatively high OAF (for example, 80%-100%) for a predetermined time. The controller 40 may control the actuator 25 to thereby adjust the position of the switching door 23c. For example, within one minute after starting of the vehicle in a state in which the vehicle is parked for a long time and the indoor temperature of the vehicle relatively rises due to the greenhouse effect, when the difference between the indoor temperature of the vehicle and the outdoor air temperature is higher than or equal to 0° C., and the amount of solar radiation measured by the solar sensor is higher than or equal to 300 W, the controller 40 may determine that the indoor condition of the vehicle meets the soaking condition. When it is determined that the indoor condition of the vehicle meets the soaking condition, the controller 40 may control the actuator 25 to place the switching door 23c in the outdoor air intake position for one minute. Accordingly, the OAF may be maintained at 100% for one minute, and the passenger compartment 2 of the vehicle may be not only ventilated by the outdoor air but also cooled by the outdoor air of relatively low temperature.

When it is determined in S12 that the indoor condition of the vehicle does not meet the soaking condition or after the soaking logic is performed in S12-1, the battery management system 41 or the controller 40 may determine whether a first outdoor air intake signal is generated at S13. According to an alternative exemplary embodiment, the battery management system 41 or the controller 40 may determine whether the first outdoor air intake signal is generated while the soaking logic is performed simultaneously.

According to an exemplary embodiment, the battery management system 41 may determine whether the overheat degree of the battery 6 is higher than or equal to a predetermined first reference overheat degree and is lower than or equal to a predetermined second reference overheat degree to thereby determine whether the first outdoor air intake signal is generated. When it is determined that the overheat degree of the battery 6 is higher than or equal to the first reference overheat degree and is lower than or equal to the second reference overheat degree, the battery management system 41 may generate the first outdoor air intake signal, and the battery management system 41 may transmit the first outdoor air intake signal to the controller 40. The first reference overheat degree and the second reference overheat degree may be to divide the overheat degree of the battery 6 in levels, and the second reference overheat degree may be higher than the first reference overheat degree. For example, when the temperature of the battery 6 is higher than or equal to a predetermined first reference temperature, and is lower than or equal to a predetermined second reference temperature, the battery management system 41 may generate the first outdoor air intake signal, and the battery management system 41 may transmit the first outdoor air intake signal to the controller 40. The first reference temperature and the second reference temperature may be to divide the temperature of the battery 6 in levels, and the second reference temperature may be higher than the first reference temperature.

According to another exemplary embodiment, the controller 40 may receive the battery information from the battery management system 41, and may determine whether the overheat degree of the battery 6 is higher than or equal to the predetermined first reference overheat degree and is lower than or equal to the predetermined second reference overheat degree using the received battery information to thereby determine whether the first outdoor air intake signal is generated. When it is determined that the overheat degree of the battery 6 is higher than or equal to the first reference overheat degree and is lower than or equal to the second reference overheat degree, the controller 40 may generate the first outdoor air intake signal. For example, when the temperature of the battery 6 is higher than or equal to the predetermined first reference temperature and is lower than or equal to the predetermined second reference temperature, the controller 40 may generate the first outdoor air intake signal.

When it is determined that the first outdoor air intake signal is generated, the controller 40 may calculate a cooling load A of the passenger compartment 2 at S13-1. The cooling load A may be calculated based on a difference between a target cooling temperature set by a user and an actual cooling temperature measured by a temperature sensor. The target cooling temperature may be set by the user via a temperature controller of the vehicle, and the actual cooling temperature may be measured by one or more temperature sensors mounted in various positions of the HVAC system.

According to an exemplary embodiment, the cooling load A may be calculated using a temperature sensor mounted on the outlet duct 24. Specifically, the cooling load A may be determined by a difference between a target temperature of the outlet duct 24 and an actual temperature of the outlet duct 24 measured by the temperature sensor. For example, when the target temperature of the outlet duct 24 is 10° C., and the actual temperature of the outlet duct 24 is 30° C., the cooling load A may be calculated as 20.

According to another exemplary embodiment, the cooling load A may be calculated using a temperature sensor mounted in the passenger compartment 2. Specifically, the cooling load A may be determined by a difference between a target temperature of the passenger compartment 2 and an actual temperature of the passenger compartment 2 measured by the temperature sensor. For example, when the target temperature of the passenger compartment 2 is 20° C., and the actual temperature of the passenger compartment 2 is 40° C., the cooling load A may be calculated as 20.

According to another exemplary embodiment, the cooling load A may be calculated using a temperature sensor mounted on the evaporator 22. Specifically, the cooling load A may be determined by a difference between a target temperature of the evaporator 22 and an actual temperature of the evaporator 22 measured by the temperature sensor. For example, when the target temperature of the evaporator 22 is 10° C., and the actual temperature of the evaporator 22 is 30° C., the cooling load A may be calculated as 20.

According to another exemplary embodiment, the cooling load A may be calculated using a cooling load calculation formula which is set based on types of vehicles.

According to another exemplary embodiment, the cooling load A may be calculated using at least one of the temperature sensor mounted on the outlet duct 24, the temperature sensor mounted in the passenger compartment 2, the temperature sensor mounted on the evaporator 22, and the cooling load calculation formula. When the first outdoor air intake signal is generated, the controller 40 may determine the OAF based on the cooling load A of the passenger compartment 2.

The controller 40 may calculate a corrected cooling load C by applying one or more correction values to the cooling load A at S13-2.

The correction value may be at least one of a first correction value B with respect to the temperature BT of the battery 6, a second correction value V with respect to the speed of the vehicle, and a third correction value AMB with respect to the outdoor air temperature of the vehicle.

As shown in table 1 below, as the temperature BT of the battery 6 increases, the first correction value B may decrease. According to an exemplary embodiment, the corrected cooling load C may be a value (C=A×B) obtained by multiplying the cooling load A by the first correction value B. Accordingly, as the temperature BT of the battery 6 increases, the corrected cooling load C may decrease, and as the corrected cooling load C decreases, the OAF may increase.

TABLE 1

| Battery Temperature (BT) | B |
|---|---|
| 45~47 | 1 |
| 48~49 | 0.9 |
| 50~51 | 0.8 |
| 52~53 | 0.7 |
| 54~55 | 0.6 |
| 56~ | 0.5 |

As shown in table 2 below, as the vehicle speed increases, the second correction value V may increase. According to an exemplary embodiment, the corrected cooling load C may be a value (C=A×V) obtained by multiplying the cooling load A by the second correction value V. Accordingly, as the vehicle speed increases, the corrected cooling load C may increase, and as the corrected cooling load C increases, the OAF may decrease.

TABLE 2

| Vehicle Speed | V |
|---|---|
| 0~20 | 0.5 |
| 20~40 | 0.6 |
| 40~60 | 0.7 |
| 60~80 | 0.8 |
| 80~100 | 0.9 |
| 100~ | 1 |

As shown in table 3 below, as the outdoor air temperature increases, the third correction value AMB may decrease. According to an exemplary embodiment, the corrected cooling load C may be a value (C=A×AMB) obtained by multiplying the cooling load A by the third correction value AMB. Accordingly, as the outdoor air temperature increases, the corrected cooling load C may decrease, and as the corrected cooling load C decreases, the OAF may increase.

TABLE 3

| Outdoor Air Temperature | AMB |
|---|---|
| ~30 | 1 |
| 30~35 | 0.9 |
| 35~40 | 0.8 |
| 40~45 | 0.7 |
| 45~50 | 0.6 |
| 50~ | 0.5 |

According to an exemplary embodiment, the corrected cooling load C may be a value (C=A×B×V) obtained by multiplying the cooling load A by the first correction value B and the second correction value V.

According to an exemplary embodiment, the corrected cooling load C may be a value (C=A×B×AMB) obtained by multiplying the cooling load A by the first correction value B and the third correction value AMB.

According to an exemplary embodiment, the corrected cooling load C may be a value (C=A×V×AMB) obtained by multiplying the cooling load A by the second correction value V and the third correction value AMB.

According to an exemplary embodiment, the corrected cooling load C may be a value (C=A×B×V×AMB) obtained by multiplying the cooling load A by the first correction value B, the second correction value V, and the third correction value AMB.

When the first outdoor air intake signal is generated, the controller 40 may determine the OAF based on the corrected cooling load C which is divided into a plurality of ranges. Specifically, as the corrected cooling load C increases, the OAF may decrease, and as the corrected cooling load C decreases, the OAF may increase. For example, when the corrected cooling load C is less than or equal to 5 KW at S14-1, the OAF may be 80% at S15-1. When the corrected cooling load C exceeds 5 KW and is less than or equal to 10 KW at S14-2, the OAF may be 70% at S15-2. When the corrected cooling load C exceeds 10 KW and is less than or equal to 15 KW at S14-3, the OAF may be 60% at S15-3. When the corrected cooling load C exceeds 15 KW and is less than or equal to 20 KW at S14-4, the OAF may be 50% at S15-4. When the corrected cooling load C exceeds 20 KW and is less than or equal to 25 KW at S14-5, the OAF may be 40% at S15-5. When the corrected cooling load C exceeds 25 KW and is less than or equal to 30 KW at 514-6, the OAF may be 30% at 515-6. When the corrected cooling load C exceeds 30 KW at S14-7, the OAF may be 20% at S15-7.

When it is determined in S13 that the first outdoor air intake signal is not generated, the battery management system 41 or the controller 40 may generate a second outdoor air intake signal at S16.

According to an exemplary embodiment, the battery management system 41 may determine whether the overheat degree of the battery 6 exceeds the second reference overheat degree to thereby determine whether the second outdoor air intake signal is generated. When it is determined that the overheat degree of the battery 6 exceeds the second reference overheat degree, the battery management system 41 may generate the second outdoor air intake signal, and the battery management system 41 may transmit the second outdoor air intake signal to the controller 40. For example, when the temperature of the battery 6 exceeds the second reference temperature, the battery management system 41 may generate the second outdoor air intake signal, and the battery management system 41 may transmit the second outdoor air intake signal to the controller 40.

According to another exemplary embodiment, the controller 40 may receive the battery information from the battery management system 41, and determine whether the overheat degree of the battery 6 exceeds the second reference overheat degree using the received battery information to thereby determine whether the second outdoor air intake signal is generated. When it is determined that the overheat degree of the battery 6 exceeds the second reference overheat degree, the controller 40 may generate the second outdoor air intake signal. For example, when the temperature of the battery 6 exceeds the second reference temperature, the controller 40 may generate the second outdoor air intake signal. When the second outdoor air intake signal is generated, the controller 40 may calculate a cooling load A of the passenger compartment 2 at S16-1.

When the second outdoor air intake signal is generated, the controller 40 may determine the OAF based on the cooling load A of the passenger compartment 2. The controller 40 may calculate a corrected cooling load C by applying one or more correction values to the cooling load A at S16-2.

When the second outdoor air intake signal is generated, the controller 40 may determine the OAF based on the corrected cooling load C which is divided into a plurality of ranges. Specifically, as the corrected cooling load C increases, the OAF may decrease, and as the corrected cooling load C decreases, the OAF may increase. For example, when the corrected cooling load C is less than or equal to 5 KW at S17-1, the OAF may be 100% at S18-1. When the corrected cooling load C exceeds 5 KW and is less than or equal to 10 KW at S17-2, the OAF may be 80% at S18-2. When the corrected cooling load C exceeds 10 KW and is less than or equal to 15 KW at S17-3, the OAF may be 70% at S18-3. When the corrected cooling load C exceeds 15 KW and is less than or equal to 20 KW at S17-4, the OAF may be 60% at S18-4. When the corrected cooling load C exceeds 20 KW and is less than or equal to 25 KW at S17-5, the OAF may be 50% at S18-5. When the corrected cooling load C exceeds 25 KW and is less than or equal to 30 KW at S17-6, the OAF may be 40% at S18-6. When the corrected cooling load C exceeds 30 KW at 517-7, the OAF may be 30% at 518-7.

In addition, a first correction value, a second correction value, and a third correction value which are used to calculate the corrected cooling load C when the second outdoor air intake signal is generated may be set differently from those which are used to calculate the corrected cooling load C when the first outdoor air intake signal is generated.

As described above, in order to improve the battery cooling performance, in a condition in which the outdoor air intake into the passenger compartment 2 is required, the OAF which is determined when the second outdoor air intake signal is generated (when the overheat degree of the battery 6 exceeds the predetermined reference overheat degree) may be relatively increased, compared to the OAF which is determined when the first outdoor air intake signal is generated (the overheat degree of the battery 6 is lower than or equal to the predetermined reference overheat degree). That is, the OAFs may be determined based on the overheat degree of the battery 6 which is divided into two levels.

According to the exemplary embodiment illustrated in FIG. 3, the first outdoor air intake signal and the second outdoor air intake signal may be determined based on the overheat degree of the battery 6 which is divided into two levels, and thus the OAF may be determined for each of the first outdoor air intake signal and the second outdoor air intake signal. However, the present inventive concept is not limited thereto. Two or more outdoor air intake signals may be determined based on the overheat degree of the battery 6 which is divided into two or more levels, and thus the OAF may be determined for each of the two or more outdoor air intake signals.

According to an alternative exemplary embodiment, a correction factor D corresponding to the first outdoor air intake signal and the second outdoor air intake signal may be multiplied by the corrected cooling load C. In FIG. 3, when the second outdoor air intake signal is generated, the calculation of the cooling load A at S16-1, the calculation of the corrected cooling load C at S16-2, and the determination of the OAF (S17-1, S17-2, S17-3, S17-4, S17-5, S17-6, S17-7, S18-1, S18-2, S18-3, S18-4, S18-5, S18-6, and S18-7) may be omitted. For example, when the first outdoor air intake signal is generated, the correction factor D may be 1 (D=1), and when the second outdoor air intake signal is generated, the correction factor D may be 0.9 (D=0.9). The OAF may be determined based on a value obtained by multiplying the correction factor D and the corrected cooling load C. When the corrected cooling load C is a value (C=A×B) obtained by multiplying the cooling load A by the first correction value B, the correction factor D may be multiplied by the corrected cooling load C (C×D=A×B×D). When the corrected cooling load C is a value (C=A×V) obtained by multiplying the cooling load A by the second correction value V, the correction factor D may be multiplied by the corrected cooling load C (C×D=A×V×D). When the corrected cooling load C is a value (C=A×AMB) obtained by multiplying the cooling load A by the third correction value AMB, the correction factor D may be multiplied by the corrected cooling load C (C×D=A×AMB×D). When the corrected cooling load C is a value (C=A×B×V) obtained by multiplying the cooling load A by the first correction value B and the second correction value V, the correction factor D may be multiplied by the corrected cooling load C (C×D=A×B×V×D). When the corrected cooling load C is a value (C=A×B×AMB) obtained by multiplying the cooling load A by the first correction value B and the third correction value AMB, the correction factor D may be multiplied by the corrected cooling load C (C×D=A×B×AMB×D). When the corrected cooling load C is a value (C=A×V×AMB) obtained by multiplying the cooling load A by the second correction value V and the third correction value AMB, the correction factor D may be multiplied by the corrected cooling load C (C×D=A×V×AMB×D). When the corrected cooling load C is a value (C=A×B×V×AMB) obtained by multiplying the cooling load A by the first correction value B, the second correction value V, and the third correction value AMB, the correction factor D may be multiplied by the corrected cooling load C (C×D=A×B×V×AMB×D).

According to another exemplary embodiment, when the second outdoor air intake signal is generated, the OAF corresponding to the second outdoor air intake signal may be determined by adding a correction value E to the OAF which is determined when the first outdoor air intake signal is generated (OAF+E), without calculating the cooling load A and the corrected cooling load C. For example, the correction value E may be 10. In a case in which the OAF is determined as 80% when the first outdoor air intake signal is generated, the OAF may be determined to be 90% (OAF+E) when the second outdoor air intake signal is generated.

Figure 4:
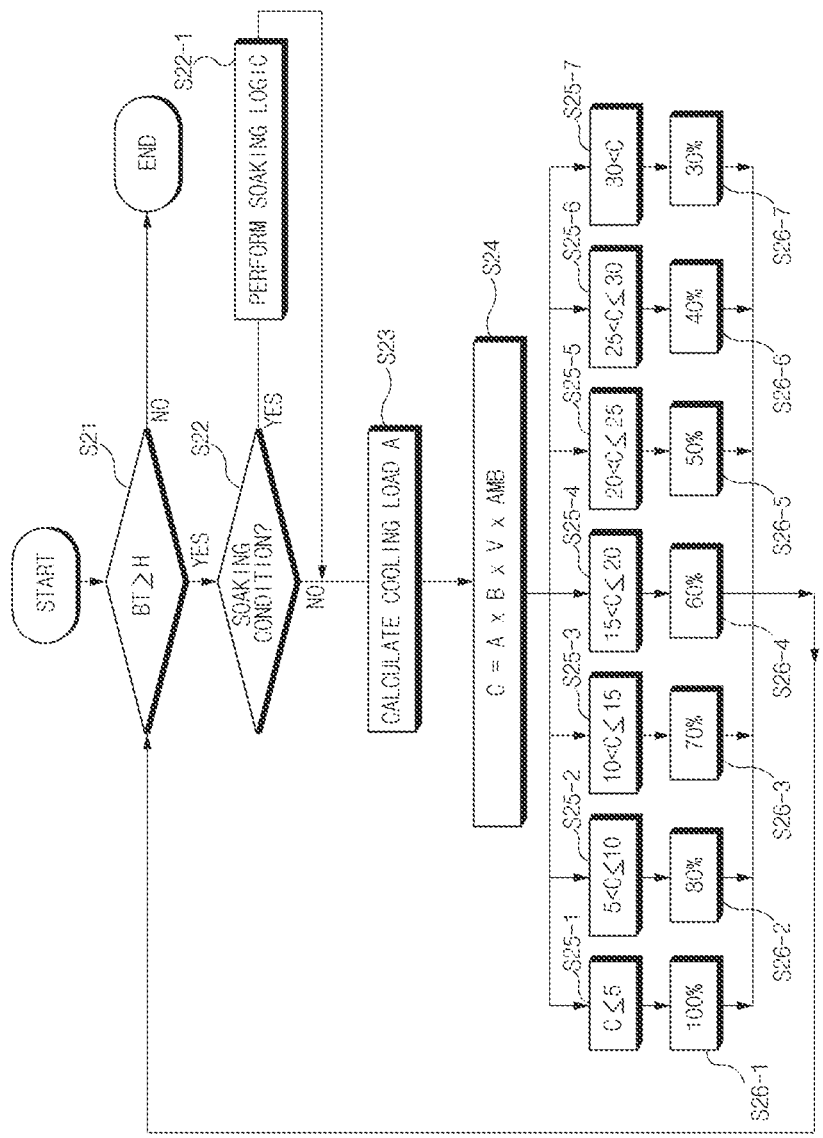
FIG. 4 illustrates a flowchart of a method for controlling a vehicle thermal management system according to an exemplary embodiment of the present disclosure.

FIG. 4 illustrates a flowchart of a method for controlling a vehicle thermal management system according to an exemplary embodiment of the present disclosure.

The controller 40 may determine whether a temperature BT of the battery 6 is higher than or equal to a threshold value H at S21. For example, the threshold value H may be approximately 45° C. which may be considered a state in which the battery 6 is overheated. According to an exemplary embodiment, the threshold value H may be equal to the first reference temperature mentioned in the exemplary embodiment of FIG. 3. According to another exemplary embodiment, the threshold value H may be different from the first reference temperature mentioned in the exemplary embodiment of FIG. 3.

When it is determined in S21 that the temperature BT of the battery 6 is higher than or equal to the threshold value H, the controller 40 may determine whether an indoor condition of the vehicle meets a soaking condition at S22. The soaking condition refers to a condition in which the vehicle is stopped for a long time, and an indoor temperature of the vehicle is higher than an outdoor air temperature. Specifically, the controller 40 may determine that the indoor condition of the vehicle meets the soaking condition under the following conditions: within a predetermined time (for example, one minute) after starting of the vehicle, a difference between the indoor temperature and the outdoor air temperature is higher than or equal to a predetermined temperature (for example, 0-1° C.); and the amount of solar radiation measured by a solar sensor is higher than or equal to a predetermined amount of solar radiation (for example, 300 W).

When it is determined in S22 that the indoor condition of the vehicle meets the soaking condition, a soaking logic may be performed at S22-1. The soaking logic refers to a logic for adjusting the position of the switching door 23c so as to maintain relatively high OAF (for example, 80%-100%) for a predetermined time (one to two minutes). The controller 40 may control the actuator 25 to thereby adjust the position of the switching door 23c. For example, within one minute after starting of the vehicle in a state in which the vehicle is parked for a long time and the indoor temperature of the vehicle relatively rises due to the greenhouse effect, when the difference between the indoor temperature of the vehicle and the outdoor air temperature is higher than or equal to 0° C., and the amount of solar radiation measured by the solar sensor is higher than or equal to 300 W, the controller 40 may determine that the indoor condition of the vehicle meets the soaking condition. When it is determined that the indoor condition of the vehicle meets the soaking condition, the controller 40 may control the actuator 25 to place the switching door 23c in the outdoor air intake position for one minute. Accordingly, the OAF may be maintained at 100% for one minute, and the passenger compartment 2 of the vehicle may be not only ventilated by the outdoor air but also cooled by the outdoor air of relatively low temperature.

When it is determined in S22 that the indoor condition of the vehicle does not meet the soaking condition or after the soaking logic is performed in S22-1, the controller 40 may calculate a cooling load A of the passenger compartment 2 at S23. The controller 40 may determine the OAF based on the cooling load A of the passenger compartment 2. According to an alternative exemplary embodiment, the controller 40 may calculate the cooling load A of the passenger compartment 2 while performing the soaking logic simultaneously.

The controller 40 may calculate a corrected cooling load C by applying one or more correction values to the cooling load A at S24. The correction value may be at least one of a first correction value B with respect to the temperature BT of the battery 6, a second correction value V with respect to the speed of the vehicle, and a third correction value AMB with respect to the outdoor air temperature of the vehicle.

The first correction value B, the second correction value V, and the third correction value AMB may be set variously as shown above in table 1, table 2, and table 3.

The controller 40 may determine the OAF based on the corrected cooling load C which is divided into a plurality of ranges. Specifically, as the corrected cooling load C increases, the OAF may decrease, and as the corrected cooling load C decreases, the OAF may increase. For example, the corrected cooling load C is less than or equal to 5 KW at S25-1, the OAF may be 100% at S26-1. When the corrected cooling load C exceeds 5 KW and is less than or equal to 10 KW at S25-2, the OAF may be 80% at S26-2. When the corrected cooling load C exceeds 10 KW and is less than or equal to 15 KW at S25-3, the OAF may be 70% at S26-3. When the corrected cooling load C exceeds 15 KW and is less than or equal to 20 KW at S25-4, the OAF may be 60% at S26-4. When the corrected cooling load C exceeds 20 KW and is less than or equal to 25 KW at S25-5, the OAF may be 50% at S26-5. When the corrected cooling load C exceeds 25 KW and is less than or equal to 30 KW at S25-6, the OAF may be 40% at S26-6. When the corrected cooling load C exceeds 30 KW at S25-7, the OAF may be 30% at S26-7.

Figure 5:
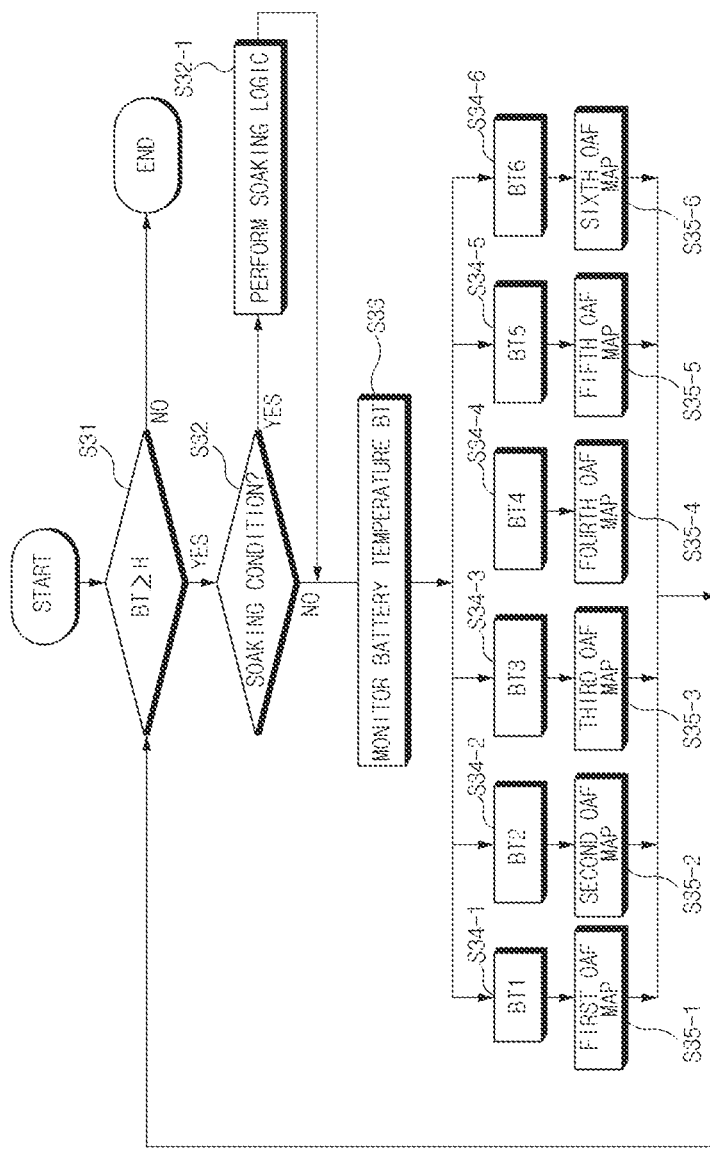
FIG. 5 illustrates a flowchart of a method for controlling a vehicle thermal management system according to an exemplary embodiment of the present disclosure.

FIG. 5 illustrates a flowchart of a method for controlling a vehicle thermal management system according to an exemplary embodiment of the present disclosure.

The controller 40 may determine whether a temperature BT of the battery 6 is higher than or equal to a threshold value H at S31. For example, the threshold value H may be approximately 45° C. which may be considered a state in which the battery 6 is overheated. According to an exemplary embodiment, the threshold value H may be equal to the first reference temperature mentioned in the exemplary embodiment of FIG. 3. According to another exemplary embodiment, the threshold value H may be different from the first reference temperature mentioned in the exemplary embodiment of FIG. 3.

When it is determined in S31 that the temperature BT of the battery 6 is higher than or equal to the threshold value H, the controller 40 may determine whether an indoor condition of the vehicle meets a soaking condition at S32. The soaking condition refers to a condition in which the vehicle is stopped for a long time, and an indoor temperature of the vehicle is higher than an outdoor air temperature. Specifically, the controller 40 may determine that the indoor condition of the vehicle meets the soaking condition under the following conditions: within a predetermined time (for example, one minute) after starting of the vehicle, a difference between the indoor temperature and the outdoor air temperature is higher than or equal to a predetermined temperature (for example, 0-1° C.); and the amount of solar radiation measured by a solar sensor is higher than or equal to a predetermined amount of solar radiation (for example, 300 W).

When it is determined in S32 that the indoor condition of the vehicle meets the soaking condition, a soaking logic may be performed at S32-1. The soaking logic refers to a logic for adjusting the position of the switching door 23c so as to maintain relatively high OAF (for example, 80%-100%) for a predetermined time (one to two minutes). The controller 40 may control the actuator 25 to thereby adjust the position of the switching door 23c. For example, within one minute after starting of the vehicle in a state in which the vehicle is parked for a long time and the indoor temperature of the vehicle relatively rises due to the greenhouse effect, when the difference between the indoor temperature of the vehicle and the outdoor air temperature is higher than or equal to 0° C., and the amount of solar radiation measured by the solar sensor is higher than or equal to 300 W, the controller 40 may determine that the indoor condition of the vehicle meets the soaking condition. When it is determined that the indoor condition of the vehicle meets the soaking condition, the controller 40 may control the actuator 25 to place the switching door 23c in the outdoor air intake position for one minute. Accordingly, the OAF may be maintained at 100% for one minute, and the passenger compartment 2 of the vehicle may be not only ventilated by the outdoor air but also cooled by the outdoor air of relatively low temperature.

When it is determined in S32 that the indoor condition of the vehicle does not meet the soaking condition or after the soaking logic is performed in S32-1, the controller 40 may monitor the temperature BT of the battery 6 at S33. The temperature of the battery 6 may be measured by the battery management system 41, and the controller 40 may monitor the temperature BT of the battery 6 by receiving the temperature of the battery 6 from the battery management system 41. According to an alternative exemplary embodiment, the controller 40 may monitor the temperature BT of the battery 6 while performing the soaking logic simultaneously.

The temperature BT of the battery 6 may be divided into a plurality of battery temperature ranges BT1, BT2, BT3, BT4, BT5, and BT6. The temperature BT of the battery 6 may be divided into six battery temperature ranges as shown in table 4 below.

TABLE 4

| Battery Temperature | |
|---|---|
| 45~47° C. | BT1 |
| 48~49° C. | BT2 |
| 50~51° C. | BT3 |
| 52~53° C. | BT4 |
| 54~55° C. | BT5 |
| 56° C.~ | BT6 |

The controller 40 may determine the OAFs using a plurality of OAF maps corresponding to the plurality of battery temperature ranges BT1, BT2, BT3, BT4, BT5, and BT6 (S35-1, S35-2, S35-3, S35-4, S35-5, and S35-6). The plurality of OAF maps may correspond to the battery temperature ranges BT1, BT2, BT3, BT4, BT5, and BT6, respectively.

Table 5 below shows a first OAF map corresponding to a first battery temperature range BT1.

TABLE 5

| First OAF Map (BT1: 45~47) | |
|---|---|
| Vehicle Speed | OAF |
| 0~20 | 20% |
| 20~40 | 18% |
| 40~60 | 16% |
| 60~80 | 14% |
| 80~100 | 12% |
| 100~ | 10% |

As shown in table 5, the OAF corresponding to the first battery temperature range BT1 may be determined based on the vehicle speed. As the first battery temperature range BT1 is not relatively high, the OAF may be set to be relatively low. As the vehicle speed increases, the OAF may decrease.

Table 6 below shows a second OAF map corresponding to a second battery temperature range BT2.

TABLE 6

| Second OAF Map (BT2: 48~49) | |
|---|---|
| Vehicle Speed | OAF |
| 0~20 | 40% |
| 20~40 | 38% |
| 40~60 | 36% |
| 60~80 | 34% |
| 80~100 | 32% |
| 100~ | 30% |

As shown in table 6, the OAF corresponding to the second battery temperature range BT2 may be determined based on the vehicle speed. As the second battery temperature range BT2 is relatively higher than the first battery temperature range BT1, the OAF may be set to be relatively high. As the vehicle speed increases, the OAF may decrease.

Table 7 below shows a third OAF map corresponding to a third battery temperature range BT3.

TABLE 7

| Third OAF Map (BT3: 50~51) | |
|---|---|
| Vehicle Speed | OAF |
| 0~20 | 60% |
| 20~40 | 58% |
| 40~60 | 56% |
| 60~80 | 54% |
| 80~100 | 52% |
| 100~ | 50% |

As shown in table 7, the OAF corresponding to the third battery temperature range BT3 may be determined based on the vehicle speed. As the third battery temperature range BT3 is relatively higher than the second battery temperature range BT2, the OAF may be set to be relatively high. As the vehicle speed increases, the OAF may decrease.

Table 8 below shows a fourth OAF map corresponding to a fourth battery temperature range BT4.

TABLE 8

| Fourth OAF Map (BT4: 52~53) | |
|---|---|
| Vehicle Speed | OAF |
| 0~20 | 80% |
| 20~40 | 78% |
| 40~60 | 76% |
| 60~80 | 74% |
| 80~100 | 72% |
| 100~ | 70% |

As shown in table 8, the OAF corresponding to the fourth battery temperature range BT4 may be determined based on the vehicle speed. As the fourth battery temperature range BT4 is relatively higher than the third battery temperature range BT3, the OAF may be set to be relatively high. As the vehicle speed increases, the OAF may decrease.

Table 9 below shows a fifth OAF map corresponding to a fifth battery temperature range BT5.

TABLE 9

Fifth OAF Map (BT5: 54~55)

| Vehicle Speed | OAF |
|---|---|
| 0~20 | 90% |
| 20~40 | 88% |
| 40~60 | 86% |
| 60~80 | 84% |
| 80~100 | 82% |
| 100~ | 80% |

As shown in table 9, the OAF corresponding to the fifth battery temperature range BT5 may be determined based on the vehicle speed. As the fifth battery temperature range BT5 is relatively higher than the fourth battery temperature range BT4, the OAF may be set to be relatively high. As the vehicle speed increases, the OAF may decrease.

Table 10 below shows a sixth OAF map corresponding to a sixth battery temperature range BT6.

TABLE 10

Sixth OAF Map (BT6: 56~)

| Vehicle Speed | OAF |
|---|---|
| 0~20 | 100% |
| 20~40 | 98% |
| 40~60 | 96% |
| 60~80 | 94% |
| 80~100 | 92% |
| 100~ | 90% |

As shown in table 10, the OAF corresponding to the sixth battery temperature range BT6 may be determined based on the vehicle speed. As the sixth battery temperature range BT6 is relatively higher than the fifth battery temperature range BT5, the OAF may be set to be relatively high. As the vehicle speed increases, the OAF may decrease. As described above, each OAF map may show that with respect to the corresponding battery temperature ranges BT1, BT2, BT3, BT4, BT5, and BT6, the OAF may be determined based on a change in vehicle speed. According to an alternative exemplary embodiment, in each OAF map, the OAF may be determined by using not only a change in vehicle speed but also a change in outdoor air temperature.

According to the exemplary embodiment of FIG. 5, the OAF may be determined based on the temperature of the battery 6 and the vehicle speed, and thus the battery cooling performance may be sufficiently improved and the deterioration of the cooling of the passenger compartment 2 may be minimized.

As set forth above, the method for controlling a vehicle thermal management system according to exemplary embodiments of the present disclosure may be designed to optimally vary the OAF based on the temperature of the battery, the cooling load of the passenger compartment, and the like when the battery is overheated and the outdoor air intake into the passenger compartment is required, thereby simultaneously improving the cooling performance of the HVAC system with respect to the passenger compartment, and improving the cooling performance of the battery cooling system with respect to the battery.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A method for controlling a vehicle thermal management system, the method comprising:
   determining, by a controller, whether an outdoor air intake into a passenger compartment is required when the temperature of the battery acquired by a battery management system is higher than or equal to the predetermined reference temperature;
   maintaining, by the controller, an outdoor air fraction (OAF) at 100% for a predetermined time when an indoor condition of the vehicle meets a soaking condition;
   determining, by the controller, the OAF based on a temperature of a battery when the outdoor air intake into the passenger compartment is required;
   wherein the OAF increases as the temperature of the battery increases;
   wherein the OAF decreases as the temperature of the battery decreases; and
   wherein the soaking condition is a condition in which a difference between the indoor temperature and the outdoor air temperature is higher than or equal to a predetermined temperature, and the amount of solar radiation measured by a solar sensor is higher than or equal to a predetermined amount of solar radiation, within a predetermined time after starting of the vehicle.

2. The method according to claim 1, wherein it is determined that the outdoor air intake into the passenger compartment is required when the temperature of the battery is higher than or equal to a threshold value.

3. The method according to claim 1, wherein the temperature of the battery is divided into a plurality of battery temperature ranges, and the OAF is determined based on a plurality of OAF maps corresponding to the plurality of battery temperature ranges.

4. The method according to claim 1, wherein the OAF is determined based on a vehicle speed and the temperature of the battery.

5. A method for controlling a vehicle thermal management system, the method comprising:
   determining, by a controller, whether an outdoor air intake into a passenger compartment is required when the temperature of the battery acquired by a battery management system is higher than or equal to the predetermined reference temperature;
   maintaining, by the controller, an outdoor air fraction (OAF) at 100% for a predetermined time when an indoor condition of the vehicle meets a soaking condition;
   generating, by a controller, a first outdoor air intake signal when an overheat degree of a battery is higher than or equal to a first reference overheat degree, and is lower than or equal to a second reference overheat degree;
   generating, by the controller, a second outdoor air intake signal when the overheat degree of the battery exceeds the second reference overheat degree;
   calculating, by the controller, a cooling load of a passenger compartment when the first outdoor air intake signal or the second outdoor air intake signal is generated; and
   determining the OAF based on the calculated cooling load;
   wherein the OAF decreases as the calculated cooling load increases;

wherein the OAF increases as the calculated cooling load decreases; and wherein the soaking condition is a condition which a difference between the indoor temperature and the outdoor air temperature is higher than or equal to a predetermined temperature, and the amount of solar radiation measured by a solar sensor is higher than or equal to a predetermined amount of solar radiation, within a predetermined time after starting of the vehicle.

6. The method according to claim 5, wherein the cooling load is calculated based on a target cooling temperature set by a user and an indoor temperature of the vehicle measured by a temperature sensor mounted in the passenger compartment.

7. The method according to claim 5, wherein a corrected cooling load is calculated by applying at least one correction value to the cooling load.

8. The method according to claim 5, wherein a corrected cooling load is calculated by applying a first correction value with respect to a temperature of a battery to the cooling load.

9. The method according to claim 5, wherein a corrected cooling load is calculated by applying a second correction value with respect to a vehicle speed to the cooling load.

10. The method according to claim 5, wherein a corrected cooling load is calculated by applying a third correction value with respect to an outdoor air temperature of the vehicle acquired by the controller to the cooling load.

11. The method according to claim 5, wherein the cooling load is calculated based on a difference between a target cooling temperature set by a user and an actual cooling temperature measured by a temperature sensor.

* * * * *